(12) United States Patent
Jones et al.

(10) Patent No.: US 11,807,838 B2
(45) Date of Patent: Nov. 7, 2023

(54) NATURAL BITTERING COMPOUNDS FROM HOPS

(71) Applicant: KALAMAZOO HOLDINGS, INC., Kalamazoo, MI (US)

(72) Inventors: Matthew Blake Jones, Portage, MI (US); Hershel Jude, Jr., Kalamazoo, MI (US); Brian Patrick Buffin, Kalamazoo, MI (US); Donald Richard Berdahl, Lawton, MI (US)

(73) Assignee: KALAMAZOO HOLDINGS, INC., Kalamazoo, MI (US)

( * ) Notice: Subject to any disclaimer, the term of this patent is extended or adjusted under 35 U.S.C. 154(b) by 597 days.

(21) Appl. No.: 16/417,880

(22) Filed: May 21, 2019

(65) Prior Publication Data
US 2019/0359918 A1 Nov. 28, 2019

Related U.S. Application Data

(60) Provisional application No. 62/674,659, filed on May 22, 2018.

(51) Int. Cl.
*C12C 5/02* (2006.01)
*C12C 3/12* (2006.01)

(52) U.S. Cl.
CPC ............... *C12C 5/026* (2013.01); *C12C 3/12* (2013.01)

(58) Field of Classification Search
CPC ........... C12C 5/026; C12C 9/025; C12C 5/02; C12C 3/12
See application file for complete search history.

(56) References Cited

U.S. PATENT DOCUMENTS

| | | | |
|---|---|---|---|
| 4,389,421 A * | 6/1983 | Palamand | A23L 2/44 426/330.4 |
| 5,702,737 A | 12/1997 | Guzinski | |
| 5,783,235 A | 7/1998 | Ting | |
| 5,811,144 A | 9/1998 | Bordeleau et al. | |
| 6,849,287 B1 | 2/2005 | Rader | |
| 7,056,519 B2 * | 6/2006 | Boudet | C07K 14/005 424/188.1 |
| 2002/0110619 A1 | 8/2002 | Rader | |

(Continued)

FOREIGN PATENT DOCUMENTS

| | | |
|---|---|---|
| WO | WO1997046116 | 12/1997 |
| WO | WO02/02497 | 1/2002 |
| WO | WO2015121360 | 8/2015 |

OTHER PUBLICATIONS

Increasing Bitterness By Dry Hopping 2016 http://scottjanish.com/increasing-bitterness-dry-hopping/ (Year: 2016).*

(Continued)

*Primary Examiner* — Vera Stulii
(74) *Attorney, Agent, or Firm* — HUESCHEN AND SAGE

(57) ABSTRACT

The present invention relates to compositions and methods for adding bitter flavor to beer and other beverages. The present invention concerns the use of compositions comprising compounds that are present in hop extracts or in beer and result from natural processes that occur during processing or storage (aging) of hops or beer. The present invention further concerns the use of suitable amounts of a composition comprising humulinones for adding bitter flavor to beer and other beverages.

19 Claims, 1 Drawing Sheet trans-humulinone     cis-humulinone

Humulinone structures (R = isopropyl, isobutyl, or secbutyl)

(56) References Cited

U.S. PATENT DOCUMENTS

2003/0185933 A1 10/2003 Ting
2003/0185934 A1 10/2003 Ting
2004/0161491 A1 8/2004 Ting

OTHER PUBLICATIONS https://onlinelibrary.wiley.com/doi/pdf/10.1002/j.2050-0416.1969.tb06381.x Dierckens et al (Oxidation Product of Humulone And Their Stereo-Isomerism). (Year: 1969).*
"Humulinone, a natural hop bitter acid", Hopsteiner Newsletter, Apr. 15, URL:https://www.hopsteiner.com/news/2015/04/humulinone-natural-hop-bitter-acid/.
International Search Report for PCT/US2019/033216 dated Jul. 12, 2019.
Algazzali, et al., J. Am. Soc. Brew. Chem. 2016, 74, 36-43.
Huvaere, et al., Photochem. Photobiol. Sci. 2004, 3, 854-858.
Taniguchi, et al., J. Agric. Food Chem. 2013, 61, 3121-3130.
Oladokun, et al., BrewingScience, 2017, 70, 187-196.
Oladokun, et al., Food Chemistry, 2016, 205, 212-220.
Howard, et al., J. Inst. Brew., 1957, 63, 478-482.

* cited by examiner

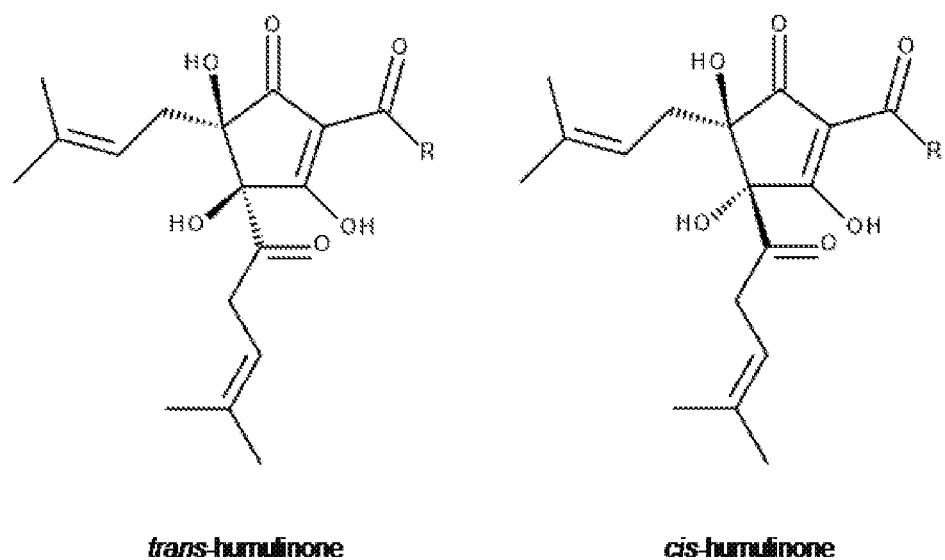
Humulinone structures (R = isopropyl, isobutyl, or secbutyl)

NATURAL BITTERING COMPOUNDS FROM HOPS

FIELD OF THE INVENTION

The present invention relates to compositions and methods for adding bitter flavor to beer and other beverages. The present invention concerns the use of compositions comprising compounds that are present in hop extracts or in beer and/or result from natural processes that occur during brewing, processing or storage (aging) of hops or beer. Brewers may prefer using these compositions over currently available alternatives because they comprise naturally occurring compounds that can be obtained through processes that do not require the use of harsh chemical reagents.

BACKGROUND OF THE INVENTION

Traditional methods of bittering beer use whole fresh hops, whole dried hops, or hop pellets added during the kettle boil. Hop extracts, made by extracting hops with supercritical carbon dioxide, or isomerized hop pellets, made by heating hops in the presence of a catalyst, are more recent bittering innovations that have also been adopted by brewers. Hop pellets can also be added later in the brewing process and, in the case of dry hopping, hops are added to the wort during fermentation, or to the finished beer, prior to filtration. These methods suffer from a poor utilization of the bittering compounds present in the hops, which impacts the cost unfavorably. Further, the vegetative matter added during dry hopping absorbs liquid, thus resulting in product loss for the brewer upon separation of these solids from the beer.

Beer or other malt beverages produced in this manner are unstable to light and must be packaged in dark brown bottles or cans to avoid light-induced formation of 3-methyl-2-butene-1-thiol (3-MBT), which gives a pronounced light-struck or skunky aroma. This results from the light-induced degradation of isoalpha acids, which substances are naturally present in hop extracts. Riboflavin, naturally present in beer, is a photosensitizer, entering an excited state when exposed to UV and/or higher energy visible radiation. The degradation of isoalpha acids occurs when the molecule donates an electron to riboflavin to quench the excited state. The resulting radical on the now oxidized isoalpha acid localizes on the acyloin group of the molecule (i.e., the hydroxyl group adjacent to a ketone), which undergoes a Norrish cleavage producing a 4-methyl-3-pentenoyl radical. The radical is then known to cleave its carbonyl group, creating a 3-methyl-2-butenyl radical which is susceptible to reacting with sulfhydryl radicals cleaved from endogenous sulfur-containing molecules, which are generally present in the brewing process. Sources of sulfur could include amino acids, such as cysteine and methionine, which are present in beer as a constituent of proteins, shorter peptides or as free amino acids. This reaction results in the production of 3-MBT and the characteristic lightstruck aroma. Placing bottles in cardboard boxes or completely wrapping them in light-proof paper or foil coverings is another expensive method of protecting these beverages from lightstruck flavor and aroma.

Fully light-stable beers or other malt beverages can be prepared using so-called advanced or modified hop acids. Beers made using these bittering agents can be packaged in non-colored flint glass bottles without fear of forming skunky aromas. Dihydro-(rho)-isoalpha acids, tetrahydro-isoalpha acids and hexahydro-isoalpha acids are reduction products of isoalpha acids that are light-stable. In these advanced hop acids, the portion of the isoalpha acid molecule responsible for the formation of 3-MBT has been altered by reduction of a carbonyl group on the vulnerable acyloin group using sodium borohydride, or hydrogenation of an olefinic double bond using hydrogen and a noble metal catalyst, or combinations thereof.

Two of these advanced hop products, tetrahydro-isoalpha acids and hexahydro-isoalpha acids, in addition to being light-stable, have the property of enhancing the quality and quantity of the foam produced when the beer is poured. They also have an impact on the mouthfeel of the beverage. Because of these properties, these compounds are widely used in the brewing industry today. Dihydro-isoalpha acids do not exhibit foam enhancing qualities in beer relative to isoalpha acids.

Consumers and regulatory authorities are increasingly expressing a preference for natural materials over synthetic or semi-synthetic ones. Thus, a need exists to provide compositions and methods employing natural materials as bittering agents for beer and other beverages.

Humulinones are a product of the natural oxidation of alpha acids in hops. In dry-hopped beers, these compounds make up a considerable portion of the bittering acids. Algazzali and Shellhammer demonstrated that trans-humulinones are sufficiently bitter to lend 66% of the bitterness intensity of isoalpha acids when dosed at equal concentrations.

It should be noted, as well, that humulinones exhibit the vulnerable acyloin group, which group cleaves in isoalpha acids and results in the production of 3-MBT and the characteristic light-struck aroma.

Huvaere, et al. observed that humulinones may also degrade in the presence of light to a product that results from the loss of a 3-methyl-2-butenyl group, albeit via a different degradation pathway than that proposed for isoalpha acids.

Thus, there exists an unmet need for identifying light-stable bittering agents which are naturally occurring, inexpensive to produce and which exhibit desirable characteristics in beer such as bitterness, advantageous mouthfeel and foam stabilization.

OBJECTS OF THE INVENTION

It is the object of the present invention to provide a method to produce a light-stable beer using compositions comprising humulinones in the absence of isoalpha acids.

It is a further object of the present invention to provide a method to produce a light-stable beer using compositions comprising humulinones, alone or in combination with other light-stable bittering substances, including, but not limited to tetrahydro-isoalpha acids, dihydro-isoalpha acids, hexahydro-isoalpha acids, hulupones, hop hard resins, quinine, and tea polyphenols.

It is a further object of the present invention to provide a method to produce a light-stable beer using compositions comprising humulinones, which beer exhibits stable bittering comparable to modified hop acids such as dihydro-(rho)-isoalpha acids, tetrahydro-isoalpha acids and hexahydro-isoalpha acids.

It is a further object of the present invention to provide compositions comprising humulinones, which are known to occur naturally in hops or in beer, to provide consumers with a natural option to be used in the preparation of a light-stable, attractive and pleasant tasting beer.

It is a further object of the present invention to provide compositions comprising humulinones to provide brewers with a convenient, non-vegetative method to achieve the flavor and aroma of a dry-hopped beer.

It is a further object of the present invention to provide compositions to be used in processes for adding humulinones to other beverages, such as teas, coffees, herbal teas, decaffeinated tea, decaffeinated coffee, caffeine-free colas or other soft drinks in order to provide bitterness.

SUMMARY OF THE INVENTION

The present invention relates to processes for bittering malt beverages utilizing humulinone compositions which can be added at various stages of the brewing process to provide bitterness to such malt beverages One aspect of the present invention involves the use of humulinone compositions in the absence of isoalpha acids (isoalpha acid content in the finished beer below the levels that produce perceptible amounts of 3-methyl-2-butene-1-thiol (3-MBT) via light-induced degradation of isoalpha acids) in a method to produce a light-stable beer.

A further aspect of the present invention involves the use of humulinone compositions comprising naturally occurring, light-stable bittering substances from hops in the absence of isoalpha acids (isoalpha acid content in the finished beer below the levels that produce detectable amounts of 3-methyl-2-butene-1-thiol (3-MBT) via light-induced degradation of isoalpha acids) in a method to produce a light-stable beer, wherein the light-stable bittering substances from hops also improve the foam quality (quantity, stability and form) of malt beverages.

A further aspect of the invention relates to a beer which may be made by any of the foregoing methods.

A further aspect of the invention relates to the use of the humulinone compositions described above to bitter beers, ciders, meads, other malt beverages, as well as other alcoholic and non-alcoholic beverages where a hop-derived bitterness is desired.

A further aspect of the invention relates to the use of the humulinone compositions described above to bitter other beverages, such as teas, coffees, herbal teas, decaffeinated tea, decaffeinated coffee, caffeine-free colas or other soft drinks.

Another aspect of the invention relates to a practical and effective process of providing humulinones for utilization in beers, ciders, meads, other malt beverages, as well as other alcoholic and non-alcoholic beverages where a hop-derived bitterness is desired.

In one embodiment of the invention, compositions comprising humulinones are added to a beverage. The resulting beverage is characterized by a noticeable increase in the perceived bitterness of said beverage.

In one aspect, the present invention provides humulinone compositions for flavoring a malt beverage, cider, mead, tea, coffee or soft drink.

In another aspect, the present invention provides a flavoring system for modulating the perception of bitterness in a malt beverage, cider, mead, tea, coffee or soft drink, wherein the ingredient includes a combination of humulinones and other bittering substances, including, but not limited to isoalpha acids, tetrahydro-isoalpha acids, dihydro-isoalpha acids, hexahydro-isoalpha acids, hulupones, hop hard resins, quinine, and tea polyphenols.

In another aspect, the present invention provides a flavoring system for modulating the overall flavor profile of a malt beverage, cider, mead, tea, coffee or soft drink, wherein the ingredient includes a combination of bittering and aroma compounds selected from the group consisting of humulinones and other flavoring agents known in the art. Flavoring agents include, but are not limited to: vanilla extract, chocolate flavoring, spice and herb essential oil or oleoresin flavorings, fruit flavorings, berry flavorings, citrus flavorings, wood flavorings, smoke flavorings, and tropical fruit flavorings.

In another aspect, the present invention provides an ingredient for a malt beverage, cider, mead, tea, coffee or soft drink that enhances foam stability, wherein the ingredient comprises humulinones.

In another aspect, the present invention provides a functional ingredient for a malt beverage, cider, mead, tea, coffee or soft drink that enhances the microbial stability of the beverage, wherein the ingredient comprises humulinones.

In another aspect, the present invention provides a complex, well-rounded bitterness to a malt beverage, cider, mead, tea, coffee or soft drink through a combination of humulinones and other bittering substances, including, but not limited to isoalpha acids, tetrahydro-isoalpha acids, dihydro-isoalpha acids, hexahydro-isoalpha acids, hulupones, hop hard resins, quinine, and tea polyphenols.

Another aspect of the invention relates to a bitter, light-stable beer comprising a natural hop bittering composition comprising humulinones.

A further aspect of the invention relates to such a beer which does not comprise a substance characterized as a non-natural product.

A further aspect of the invention relates to such a beer which does not comprise dihydro-isoalpha acids, tetrahydro-isoalpha acids, or hexahydro-isoalpha acids.

An alternative aspect of the invention relates to a bitter, light-stable beer comprising a natural hop bittering composition comprising humulinones, wherein the beer further comprises one or more hop products selected from dihydro-isoalpha acids, tetrahydro-isoalpha acids, hexahydro-isoalpha acids, alpha acids, or hulupones.

An alternative aspect of the invention relates to a bitter, light-stable beer comprising a natural hop bittering composition comprising humulinones, wherein the beer further comprises dihydro-isoalpha acids such that the fraction of humulinones in the total of humulinones and dihydro-isoalpha acids is between 5 and 95 mol %.

An alternative aspect of the invention relates to a bitter, light-stable beer comprising a natural hop bittering composition comprising humulinones, wherein the beer further comprises dihydro-isoalpha acids such that the fraction of humulinones in the total of humulinones and dihydro-isoalpha acids is between 10 and 90 mol %.

An alternative aspect of the invention relates to a bitter, light-stable beer comprising a natural hop bittering composition comprising humulinones, wherein the beer further comprises dihydro-isoalpha acids such that the fraction of humulinones in the total of humulinones and dihydro-isoalpha acids is between 20 and 80 mol %.

An alternative aspect of the invention relates to a bitter, light-stable beer comprising a natural hop bittering composition comprising humulinones, wherein the beer further comprises dihydro-isoalpha acids such that the fraction of humulinones in the total of humulinones and dihydro-isoalpha acids is between 30 and 70 mol %.

An alternative aspect of the invention relates to a bitter, light-stable beer comprising a natural hop bittering composition comprising humulinones, wherein the beer further comprises hulupones such that the fraction of humulinones in the total of humulinones and hulupones is between 5 and 95 mol %.

An alternative aspect of the invention relates to a bitter, light-stable beer comprising a natural hop bittering composition comprising humulinones, wherein the beer further comprises hulupones such that the fraction of humulinones in the total of humulinones and hulupones is between 10 and 90 mol %.

An alternative aspect of the invention relates to a bitter, light-stable beer comprising a natural hop bittering composition comprising humulinones, wherein the beer further comprises hulupones such that the fraction of humulinones in the total of humulinones and hulupones is between 20 and 80 mol %.

An alternative aspect of the invention relates to a bitter, light-stable beer comprising a natural hop bittering composition comprising humulinones, wherein the beer further comprises hulupones such that the fraction of humulinones in the total of humulinones and hulupones is between 30 and 70 mol %.

An alternative aspect of the invention relates to a bitter, light-stable beer comprising a natural hop bittering composition comprising humulinones, wherein the beer further comprises modified hop acids such that the fraction of humulinones in the total of humulinones and modified hop acids is between 5 and 95 mol %.

An alternative aspect of the invention relates to a bitter, light-stable beer comprising a natural hop bittering composition comprising humulinones, wherein the beer further comprises modified hop acids such that the fraction of humulinones in the total of humulinones and modified hop acids is between 10 and 90 mol %.

An alternative aspect of the invention relates to a bitter, light-stable beer comprising a natural hop bittering composition comprising humulinones, wherein the beer further comprises modified hop acids such that the fraction of humulinones in the total of humulinones and modified hop acids is between 20 and 80 mol %.

An alternative aspect of the invention relates to a bitter, light-stable beer comprising a natural hop bittering composition comprising humulinones, wherein the beer further comprises modified hop acids such that the fraction of humulinones in the total of humulinones and modified hop acids is between 30 and 70 mol %.

In another aspect, the present invention provides a convenient method for non-vegetative dry-hopping of beer, wherein the method comprises the addition of humulinones in combination with hop oils. Optionally, the method further comprises addition of other hop substances, including, but not limited to isoalpha acids, hop hard resins and polyphenolics.

In another aspect, the present invention provides a convenient method for non-vegetative dry-hopping of beer comprising the addition of a combination of humulinones and hop oils, wherein the fraction of hop oils in the total of humulinones and hop oils is between 0.1 and 100 mol %.

In another aspect, the present invention provides a convenient method for non-vegetative dry-hopping of beer comprising the addition of a combination of humulinones and hop oils, wherein the fraction of hop oils in the total of humulinones and hop oils is between 0.5 and 50 mol %.

In another aspect, the present invention provides a convenient method for non-vegetative dry-hopping of beer comprising the addition of a combination of humulinones and hop oils, wherein the fraction of hop oils in the total of humulinones and hop oils is between 1 and 25 mol %.

BRIEF DESCRIPTION OF THE DRAWINGS

FIG. 1 shows representative examples of the natural bittering compounds encompassed by the present invention.

DETAILED DESCRIPTION OF THE INVENTION

The present invention relates to natural bittering compounds that can be added at various stages of the brewing process to provide bitterness to malt beverages. Herein, the natural bittering compounds encompassed by the present invention includes humulinones and their stereoisomers. Representative compounds are shown in FIG. 1.

Herein, the term advanced hop acids includes dihydro-isoalpha acids, tetrahydro-isoalpha acids, and/or hexahydro-isoalpha acids.

Herein, the terms light-stable and light-stability refer to the property of some natural bittering compounds that make them resistant to the formation of perceptible 3-MBT upon exposure to certain wavelengths of light.

Herein, the term non-vegetative dry-hopping refers to a method of using hop extracts and advanced hop products to give a beer with authentic dry-hopped character. The method saves on beer loss due to the absence of liquid-absorbing plant (vegetative) matter and provides a more convenient method for reproducibly producing beer with the desired bitterness and aroma.

The inventors have discovered that humulinones resist the formation of perceptible 3-MBT when exposed to light, both in a model system and in beer. Due to the structural homology between isoalpha acids and humulinones, one skilled in the art would expect that humulinones would not be light-stable. Specifically, both isoalpha acids and humulinones share a 4-methylpent-3-enoyl group, which is implicated in the radical mechanism by which isoalpha acids degrade in the presence of light to eventually produce 3-MBT. Moreover, Huvaere, et al. also observed photodegradation products of humulinones that would imply the formation of 3-MBT. Surprisingly, there is no recognition in the art that humulinones are resistant toward the formation of 3-MBT and are thus suitable for the preparation of light-stable beer.

It has also been discovered that cis-humulinones are noticeably more bitter than isoalpha acids, providing approximately 120% of the bitterness of isoalpha acid at an equivalent concentration. This increased bitterness is unexpected in view of the current understanding, at least with respect to trans-humulinones, which indicates these compounds may be expected to exhibit about 66% of the bitterness intensity of isoalpha acids.

Further, the bitterness character of cis- and trans-humulinones are found to be different. While the trans-humulinones have been characterized as having a smooth bitterness, the inventors have found that cis-humulinones are harsher and more lingering in their bitterness profile. Such differences in bitterness would allow one skilled in the art to tailor a desired bitterness profile through careful blending of the humulinones, using only the two stereoisomers of humulinones or in combination with other bittering principles contained herein.

Even further, in brewing with the humulinones, it was discovered that cis-humulinones compositions herein have very good utilization (>90%) in beer when added during the kettle boil. This is surprising since it is known in the art that humulinones are only observed at substantial concentrations in beer following additions that occur after the kettle boil.

This observation gives brewers more options on how to best utilize these compounds through the brewing process.

Even further, the increased bitterness of the cis-humulinones versus isoalpha acids, in combination with their excellent utilization through the brewing process, makes the cis-humulinones an option for more cost-effective bittering through the brewing process.

The present invention is useful to the brewing industry in that it provides compositions naturally present in hops and beer that do not require special labeling for their use because they are natural components which may be present in malt beverages bittered with whole hops. The compositions can be used to prepare light-stable beverages wherein the formation of 3-MBT via light-induced degradation of isoalpha acids is greatly reduced or avoided.

In addition to providing light-stable bitterness, the compositions of the present invention enhance the volume and the stability of the foam, relative to a beer brewed without hops, that results when the malt beverage is poured.

Additional flavoring and aroma substances can be added to the inventive compositions to provide alternative flavoring. The added materials may be hop oil constituents, other essential oil components or other natural flavorings. The compositions can be used to add only bitterness (at various levels), or bitterness plus a desired hop aroma or flavor (at various levels) or other aromas or flavors (at various levels). Some of the compositions can be used in the production of light-stable malt beverages. Some of the compositions can be used to enhance the foam of malt beverages, which may or may not be light-stable.

The term flavoring agents includes, but is not limited to, essential oils from hops, vanilla extract, chocolate flavoring, spice and herb essential oil or oleoresin flavorings, fruit flavorings, berry flavorings, citrus flavorings, wood flavorings, smoke flavorings, and tropical fruit flavorings.

In dry-hopping, it has been observed that trans-humulinones are responsible for a significant fraction of the perceived bitterness in these beers. Thus, incorporating trans-humulinones is essential to brewing a beer with authentic dry-hopped character. To achieve this character, large amounts of hop pellets must be added to the beer. The dried plant matter added in this process soaks up beer, invariably resulting in substantial product loss for the brewer. A solution to this product loss is to use the humulinone compositions herein. Because these compositions are solutions and are essentially soluble in beer, no extra filtration steps are needed. To achieve complete dry-hopped character, humulinone compositions further comprising hop essential oil fractions can be utilized. Further, the trans-humulinones are optionally combined with isoalpha acids, cis-humulinones, hulupones, and/or other hop fractions to generate even more authentic dry-hopped character.

Utilization of the natural bittering compounds encompassed by the present invention provides bitterness character to the beverage.

Utilization of the natural bittering compounds encompassed by the present invention provides enhanced foam formation and stabilization of this foam on the surface of the beverage, lacing of foam on the sides of the container from which the beverage is being consumed, and/or desirable mouthfeel.

Utilization of the natural bittering compounds encompassed by this invention provides a light-stable bitterness wherein the well-known formation of 3-methyl-2-butene-1-thiol (3-MBT) via light-induced degradation of isoalpha acids is greatly reduced or avoided.

The compounds used in the compositions of the present invention may be made and/or isolated from hops using processes that are known in the art.

EXAMPLES

The following examples illustrate the invention without limiting its scope.

Example 1—A Model System for Demonstrating Relative Light-Stability of Hop Acids A system is developed to simulate the conditions and the materials essential to the process whereby hop acids are degraded to produce light-struck degradation products.

To a flask containing 3 mg cysteine and 12 mg riboflavin, is added 200 mL of purified water, such that the stock solution of these two compounds contains 15 ppm and 60 ppm of these two compounds, respectively. The stock solution is divided between two jars. To one jar, enough of an aqueous solution of isoalpha acids is added to bring the solution to an isoalpha acid concentration of 150 ppm. To the other jar enough of an aqueous solution of humulinones is added to bring the solution to a humulinone concentration of 150 ppm. The jars are placed in a light box and exposed to sufficient light to generate significant 3-MBT character in the isoalpha acids containing sample. Comparison of the two samples by olfactory analysis demonstrates that no perceptible 3-MBT is formed in the humulinone-containing samples, in contrast to the isoalpha acid-containing sample.

Example 2—Pre-Fermentation Addition of Humulinones in the Manufacture of Beer or Other Fermented Beverages To wort generated from traditional brewing grains such as, but not limited to, malted barley, is added a suitable amount of a composition comprising humulinones. The hopped wort is then converted into finished beer via traditional processes known to those skilled in the art, which could include boiling, separation of insoluble species, chilling the hopped wort, fermentation, conditioning, filtering, and other operations. The resulting beverage is characterized by a pronounced bitterness, stabilized foam on the surface of the liquid, and is not susceptible to the formation of perceptible levels of 3-MBT in the presence of light.

Alternatively, the addition of a suitable amount of a composition comprising humulinones is accompanied by the addition of a natural flavor, which alters the overall flavor of the resulting beverage. The resulting beverage is characterized by a pronounced bitterness, stabilized foam on the surface of the liquid, and is not susceptible to the formation of perceptible levels of 3-MBT in the presence of light.

Alternatively, the addition of a suitable amount of a composition comprising humulinones is accompanied by the addition of one or more hop products selected from dihydro-isoalpha acids, tetrahydro-isoalpha acids, hexahydro-isoalpha acids, alpha acids, or hulupones. The resulting beverage is characterized by a pronounced bitterness, stabilized foam on the surface of the liquid, and is not susceptible to the formation of perceptible levels of 3-MBT in the presence of light.

Example 3—Pre-Fermentation Addition of Humulinones in the Manufacture of Beer or Other Fermented Beverages with Other Added Hops To wort generated from traditional brewing grains such as, but not limited to, malted barley, is added traditional hops, such as whole-cone hops, hop pellets, or hop extracts, as well as a suitable amount of a humulinones composition. The hopped wort is then converted into finished beer via traditional processes known to those skilled in the art, which could include boiling, separation of insoluble species, chilling the hopped wort, fermentation, conditioning, filtering, and other operations. The resulting beverage is characterized by pronounced bitterness and stabilized foam on the surface of the liquid but is susceptible to the formation of 3-MBT in the presence of light.

Alternatively, the addition of a suitable amount of a comprising humulinones is accompanied by the addition of a natural flavor, which alters the overall flavor of the resulting beverage. The resulting beverage is characterized by pronounced bitterness and stabilized foam on the surface of the liquid, without the formation of 3-MBT in the presence of light.

Alternatively, addition of a suitable amount of a composition comprising humulinones is accompanied by the addition of one or more hop products selected from dihydro-isoalpha acids, tetrahydro-isoalpha acids, hexahydro-isoalpha acids, alpha acids, or hulupones. The resulting beverage is characterized by pronounced bitterness and stabilized foam on the surface of the liquid, without the formation of 3-MBT in the presence of light.

Example 4—Post-Fermentation Addition of Humulinones in the Manufacture of Beer or Other Fermented Beverages To a fermented beverage generated via traditional processes known to those skilled in the art, is added a suitable amount of a composition comprising humulinones. The addition of the composition comprising humulinones is performed either before or after a final filtration of the beverage via methods known to those skilled in the art. The resulting beverage is characterized by a pronounced bitterness, stabilized foam on the surface of the liquid, and is not susceptible to the formation of perceptible levels of 3-MBT in the presence of light if no other light unstable sources of hop bitterness have been employed in the manufacture of the fermented beverage. If traditional hop additions, such as whole-cone hops, hop pellets, or hop extracts, have been employed during the formation of the fermented beverage, the resulting beverage product is characterized by a pronounced bitterness and stabilized foam on the surface of the liquid, but is susceptible to the formation of 3-MBT in the presence of light.

Alternatively, the addition of a suitable amount of a composition comprising humulinones is accompanied by the addition of a natural flavor, which alters the overall flavor of the resulting beverage. The resulting beverage is characterized by pronounced bitterness and stabilized foam on the surface of the liquid, without the formation of 3-MBT in the presence of light.

Alternatively, addition of a suitable amount of a composition comprising humulinones is accompanied by the addition of one or more hop products selected from dihydro-isoalpha acids, tetrahydro-isoalpha acids, hexahydro-isoalpha acids, alpha acids, or hulupones. The resulting beverage is characterized by pronounced bitterness and stabilized foam on the surface of the liquid, without the formation of 3-MBT in the presence of light.

Example 5—Addition of Humulinones to Finished Beverages

To finished beverages produced via standard processes known to those skilled in the art, is added a suitable amount of a composition comprising humulinones. The resulting beverage is characterized by a pronounced bitterness, stabilized foam on the surface of the liquid, and is not susceptible to the formation of 3-MBT in the presence of light if no other light unstable sources of hop bitterness have been employed in the manufacture of the beverage.

Alternatively, the addition of a suitable amount of a composition comprising humulinones is accompanied by the addition of a natural flavor, which alters the overall flavor of the resulting beverage. The resulting beverage is characterized by pronounced bitterness and stabilized foam on the surface of the liquid, without the formation of 3-MBT in the presence of light if no other light unstable sources of hop bitterness have been employed in the manufacture of the beverage.

Alternatively, addition of a suitable amount of a composition comprising humulinones is accompanied by the addition of one or more hop products selected from dihydro-isoalpha acids, tetrahydro-isoalpha acids, hexahydro-isoalpha acids, alpha acids, or hulupones. The resulting beverage is characterized by pronounced bitterness and stabilized foam on the surface of the liquid, without the formation of 3-MBT in the presence of light if no other light unstable sources of hop bitterness have been employed in the manufacture of the beverage.

Example 6—Comparison of Traditional Dry-Hopping with Non-Vegetative Dry-Hopping Three dry-hopped IPA style beers are brewed to illustrate the effect of using humulinone compositions disclosed herein on light stability and beer loss. The wort for all three beers is prepared using the same grain bill and water chemistry. Each beer is fermented using the same yeast.

To the first beer is added Centennial hop pellets during the kettle boil at a dose that equates to one pound of pellets per barrel. The wort obtained following whirlpool is transferred to a fermenter where, after five days of fermentation, a second dose of Centennial hop pellets equaling two pounds per barrel is added. After eight total days of fermentation, the finished beer is obtained by filtration, and the beer loss and light stability are measured.

To the second beer is added a humulinone composition at a dose to equal 10 BU in the finished beer. The wort obtained following whirlpool is transferred to a fermenter where, after five days of fermentation, a dose of Centennial hop pellets equaling two pounds per barrel is added. After eight total days of fermentation, the finished beer is obtained by filtration, and the beer loss and light stability are measured.

To the third beer is added a dose of a humulinone composition at a dose to equal 10 BU in the finished beer. The wort obtained following whirlpool is transferred to a fermenter wherein a second dose of a humulinone composition is added at day five of fermentation. This dose imparts 20 BU of bitterness and hop aroma characteristic of Centennial hops. After eight days of fermentation, the finished beer is obtained by filtration and measured for beer loss and light stability.

All beers are evaluated for taste and olfactory characteristics. Each beer is found to exhibit characteristic dry-hopped bitterness from an olfactory and taste perspective.

TABLE 1

| Beer | Light stable (yes or no) | Beer loss (wt %) |
|---|---|---|
| 1 | No | 20% |
| 2 | No | 15% |
| 3 | Yes | 0% |

As demonstrated, dry hopping with pellets results in a beer that is unstable toward the formation of 3-MBT. This can be avoided by using the humulinone compositions disclosed herein for both kettle and dry-hopping additions.

Further, as observed in beers 1 and 2, significant beer loss is seen while utilizing hop pellets. Comparing to beer 3, it is shown that utilizing the humulinone compositions disclosed herein allows the brewer to achieve the bitterness and aroma of traditional dry-hopping, while avoiding costly beer losses.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

All patents, applications, publications, test methods, literature, and other materials cited herein are hereby incorporated by reference.

CITED REFERENCES

1. Algazzali, V. and Shellhammer, T. Bitterness Intensity of Oxidized Hop Acids: Humulinones and Hulupones. *J. Am. Soc. Brew. Chem.* 2016, 74, 36-43.
2. Taniguchi, Y., Matsukura, Y., Ozaki, H., Nishimura, K., and Shindo, K. Identification and Quantification of the Oxidation Products Derived from α-Acids and β-Acids During Storage of Hops (*Humulus lupulus* L.). *J. Agric. Food Chem.* 2013, 61, 3121-3130.
3. Huvaere, K., Sinnaeve, B., Van Bocxlaer, J., and De Keukeleire, D. Photooxidative Degradation of Beer Bittering Principles: Product Analysis with Respect to Light-struck Flavour Formation. *Photochem. Photobiol. Sci.* 2004, 3, 854-858.

The invention claimed is:

1. A bitter, light-stable beer comprising a hop bittering composition comprising cis-humulinones.

2. The beer of claim 1, which is substantially free of light unstable hops compositions.

3. The beer of claim 2, which is substantially free of isoalpha hop acids.

4. The beer of claim 1, which does not comprise a substance characterized as a non-natural product.

5. The beer of claim 1, which does not comprise dihydro-isoalpha acids, tetrahydro-isoalpha acids, or hexahydro-isoalpha acids.

6. The beer of claim 1, which further comprises one or more hop products selected from the group consisting of dihydro-isoalpha acids, tetrahydro-isoalpha acids, hexahydro-isoalpha acids, alpha acids, or hulupones.

7. The beer of claim 1, wherein the hop bittering composition further comprises trans-humulinones.

8. The beer of claim 7, wherein the concentration of total humulinones in said beer is at least 1 ppm and below 200 ppm.

9. The beer of claim 7, wherein the concentration of total humulinones in said beer is at least 2 ppm and below 100 ppm.

10. A method for preparing a light-stable beer, such method comprising adding a light-stable natural hop tittering composition comprising cis-humulinones, wherein the light-stable natural hop bittering composition is added pre-fermentation, during fermentation, post-fermentation or to the finished beer.

11. A method for non-vegetative dry-hopping of beer, such method comprising adding a combination of cis-humulinones and hop essential oil, wherein the combination is added pre-fermentation, during fermentation post-fermentation, or to the finished beer.

12. The method according to claim 10, wherein the concentration of cis-humulinones in said beer is at least 1 ppm and below 200 ppm.

13. The method according to claim 10, wherein the concentration of cis-humulinones n said beer is at least 2 ppm and below 100 ppm.

14. The method according to claim 11, wherein the concentration of cis-humulinones in said beer is at least 1 ppm and below 200 ppm.

15. The method according to claim 11, wherein the concentration of cis-humulinones in said beer is at least 2 ppm and below 100 ppm.

16. The beer according to claim 1, wherein the concentration of cis-humulinones is at least 1 ppm and below 200 ppm.

17. The beer according to claim 1, wherein the concentration of cis-humulinones is at least 2 ppm and below 100 ppm.

18. The method according to claim 10, wherein the hop bittering composition further comprises trans-humulinones.

19. The method according to claim 11, wherein the combination further comprises trans-humulinones.

* * * * *